United States Patent [19]

Cimarosti

[11] Patent Number: 5,062,515

[45] Date of Patent: Nov. 5, 1991

[54] CLUTCH CONTROL DEVICE

[76] Inventor: Luigi R. Cimarosti, Quai de l'Ourthe, 7, Comblain-au-Pont, Belgium, B-4170

[21] Appl. No.: 477,832
[22] PCT Filed: Jul. 20, 1989
[86] PCT No.: PCT/BE89/00035
  § 371 Date: Mar. 8, 1990
  § 102(e) Date: Mar. 8, 1990
[87] PCT Pub. No.: WO90/01123
  PCT Pub. Date: Feb. 8, 1990

[30] Foreign Application Priority Data

Jul. 21, 1988 [CH] Switzerland ............ 02 789/88-9

[51] Int. Cl.5 .................................... F16D 25/00
[52] U.S. Cl. ....................... 192/91 A; 192/85 CA
[58] Field of Search .................. 192/85 CA, 91 A

[56] References Cited

U.S. PATENT DOCUMENTS

| 2,501,005 | 3/1950 | Rockwell | 192/91 |
| 2,717,680 | 9/1955 | Smith | 198/91 |
| 4,399,898 | 8/1983 | Olschewski et al. | 192/85 CA |
| 4,560,051 | 12/1985 | Brandenstein et al. | 192/91 A |
| 4,573,561 | 3/1986 | Deem et al. | 192/91 A |
| 4,585,106 | 4/1986 | Shirley | 192/91 A |
| 4,585,108 | 4/1986 | Leigh-Monstevens | 192/91 A |
| 4,589,293 | 5/1986 | Mori | 192/91 A |
| 4,606,449 | 8/1986 | Lederman | 192/91 |
| 4,609,087 | 9/1986 | Shirley | 192/91 A |
| 4,869,355 | 9/1989 | Corral et al. | 192/85 CA |

FOREIGN PATENT DOCUMENTS

| 0095841 | 12/1983 | European Pat. Off. |
| 0168932 | 1/1986 | European Pat. Off. |
| 1255002 | 11/1971 | United Kingdom |
| 2062799 | 5/1981 | United Kingdom |
| 2112490 | 7/1983 | United Kingdom |
| 8803235 | 5/1988 | World Int. Prop. O. |

Primary Examiner—Allan D. Herrmann
Assistant Examiner—Nicholas Whitelaw
Attorney, Agent, or Firm—Walter H. Schneider

[57] ABSTRACT

The control device of a disc clutch consists of a cylinder (2) and of a piston (1). An orifice (3) makes it possible to feed under pressure into a chamber (17) formed between the cylinder and the piston fluid which comes from the master cylinder actuated by the clutch pedal. Under the pressure of the fluid, the piston (1) moves away from the cylinder (2) and controls the opening of the clutch. The device is arranged directly on the tube (8) surrounding the driveshaft, without any other fastening means. O-ring gaskets (11) make it possible to hold the device on the tube and ensure the damping of possible vibrations.

The clutch bearing is incorporated in the free end of the piston (1) in the form of a thrust ring (20) held by a ball-bearing fitting.

8 Claims, 3 Drawing Sheets

CLUTCH CONTROL DEVICE

DESCRIPTION

The present invention relates to a hydraulic control device for a clutch, comprising a clutch release bearing acting on the rotary parts of the clutch and a piston acting on the ring of the clutch bearing.

Most vehicles sold throughout the world are equipped with a clutch having one or, where appropriate, more friction discs. The friction disc is mounted on the driven shaft which transmits the engine power to the wheels. The shaft is splined at the location where the disc is mounted, so as to allow this disc to slide axially along the shaft. The engine flywheel fixed to the crankshaft has a surface which corresponds to that of the disc and against which the disc is to be laid by sliding along the splines of the shaft. To ensure that the disc is laid against the flywheel, a pressure plate integral in terms of rotation with the flywheel, but axially moveable in the same way as the disc is arranged on the other side of the disc. Springs usually of the diaphragm type press this plate against the disc and lay the latter against the flywheel. In this position, the disc is clamped between the flywheel and the plate, and the mechanism is in the engaged position. Release is obtained by pulling the pressure plate rearwards. Conventionally, this movement is controlled by levers which are arranged round the plate and which are actuated as a result of the axial thrust of the clutch bearing, itself controlled by the clutch fork (in modern devices with a diaphragm spring, the bearing acts directly on that part of the diaphragm spring performing the function of a lever). In turn, the clutch fork which is a lever is usually actuated by a hydraulic piston which acts under the pressure of a fluid delivered by way of a pipe by a master cylinder itself actuated by the clutch pedal.

This mechanism of universal use has the advantage of being widely tried and tested. However, it has a size disadvantage: the assembly formed by the bearing, fork and release cylinder comprises numerous components which result in a relatively high price and which cause many maladjustments; these maladjustments give rise to various noises and require resetting, thereby incurring expense.

To overcome these disadvantages, various mechanisms have been provided, all based on the same principle: instead of the convention bearing actuated by a fork, there is arranged around the tube surrounding the driveshaft a cylinder which is concentric relative to this tube and in which or round which slides a piston likewise concentric relative to the tube, the piston or cylinder acting on the levers which control the movement of the plate. The relative movement of the piston and of the cylinder is controlled directly as a result of the introduction of fluid under pressure coming from the hydraulic master cylinder actuated by the clutch pedal.

Of the various solutions of this type, the patent application Nos. PCT/US87/02641 (publication WO 88/03235), European Patent Application Nos. 0,119,784 and 0,092,823, French Patent Application No. FR 7,630 128 and French Patent Nos. FR 7,226,979, FR 7,227,714, FR 1,521,148, FR 1,551,796 and FR 1,556,578 may be mentioned.

As a general rule, these devices are of somewhat complex construction. Thus, most have flexible skirts or diaphragms ensuring sealing between the cylinder and the piston or relative to the outside. At all events, they require an adaptation of at least one part of the clutch for which they are intended. For example, the device described in the application No. PCT/US87/02641 has to be fastened to the clutch housing or to a fixed tube surrounding the driveshaft, these two components having to be modified.

There is no doubt that the reason why the above-mentioned devices have never been mounted on mass-produced vehicles is that it is necessary to modify components produced in large series, this modification involving considerable investment.

The use of diaphragms or membranes to ensure sealing between the cylinder and the piston is another cause of an increase in cost of the construction which has certainly contributed to slowing the spread of such devices.

One object of the present invention is to provide a hydraulic clutch control device which is in the general form of a piston and a cylinder concentric relative to the driveshaft and which is capable of being mounted, without modification, on existing clutches. The invention also aims to provide a device of simple construction and therefore of low cost price.

Another object of the invention is to provide a compact and independent clutch control device with a built-in clutch bearing, capable of being fitted on any existing clutch.

For this purpose, the characteristics of the invention are described in the claims. Other characteristics and advantages of the invention will emerge from the description of an embodiment of the invention by means of the drawings:

Figure 1:
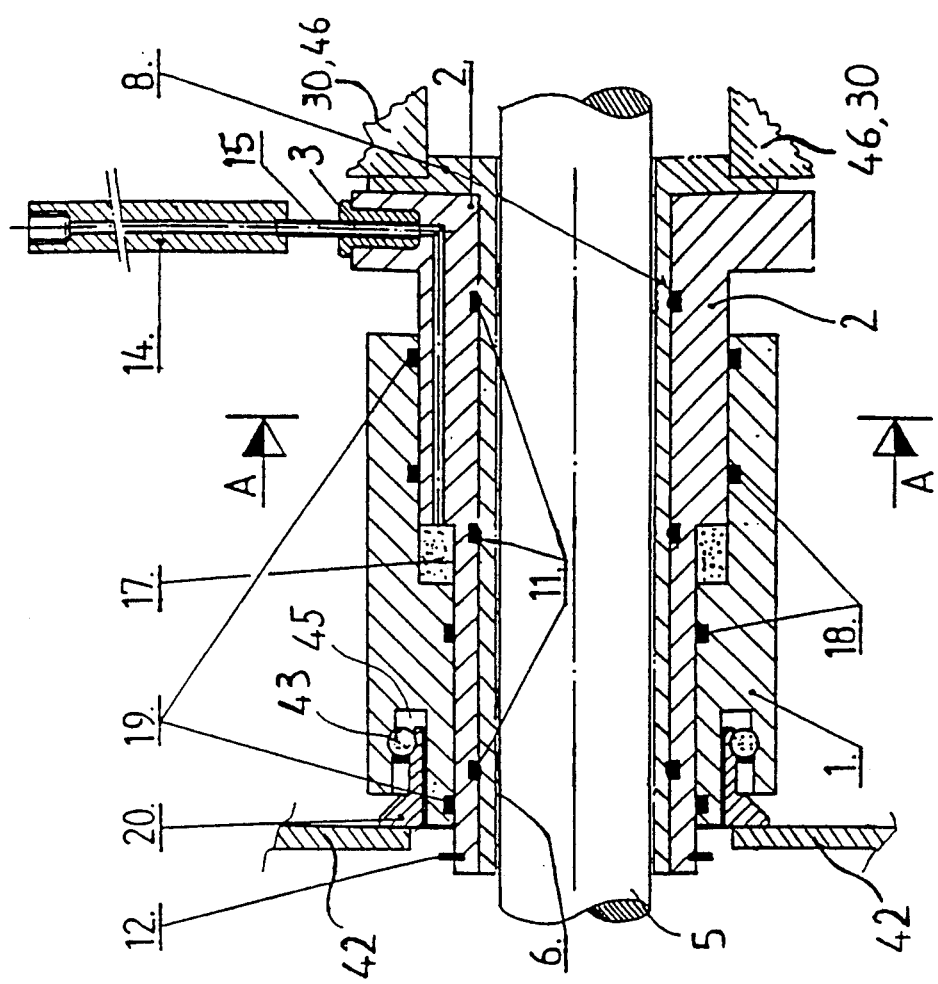
FIG. 1 is a longitudinal section through a device according to the invention.
Figure 2:
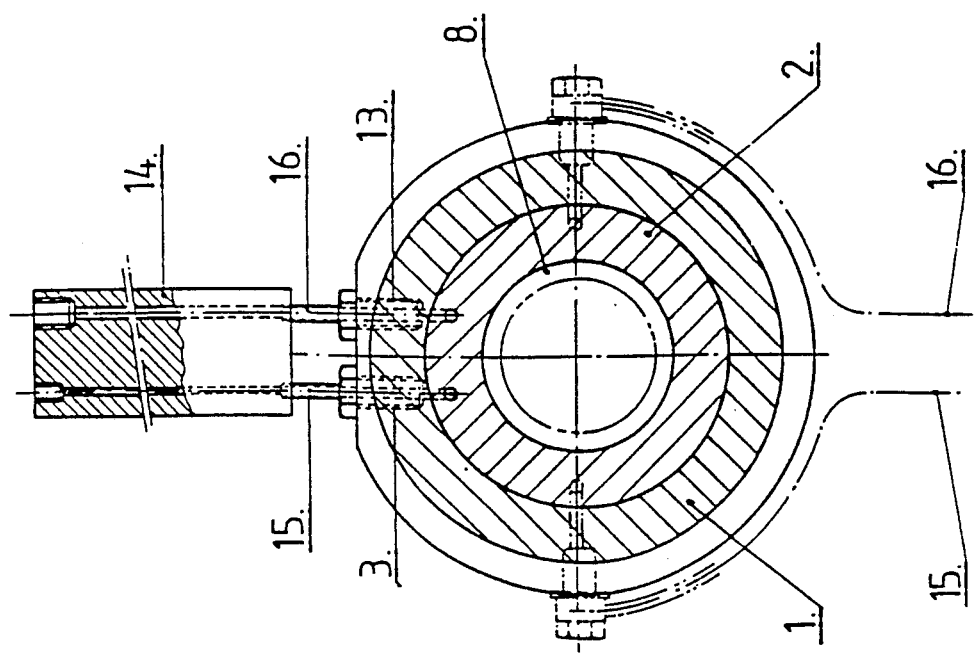
FIG. 2 is a cross-section through the device shown in FIG. 1 along the line A—A.
Figure 3:
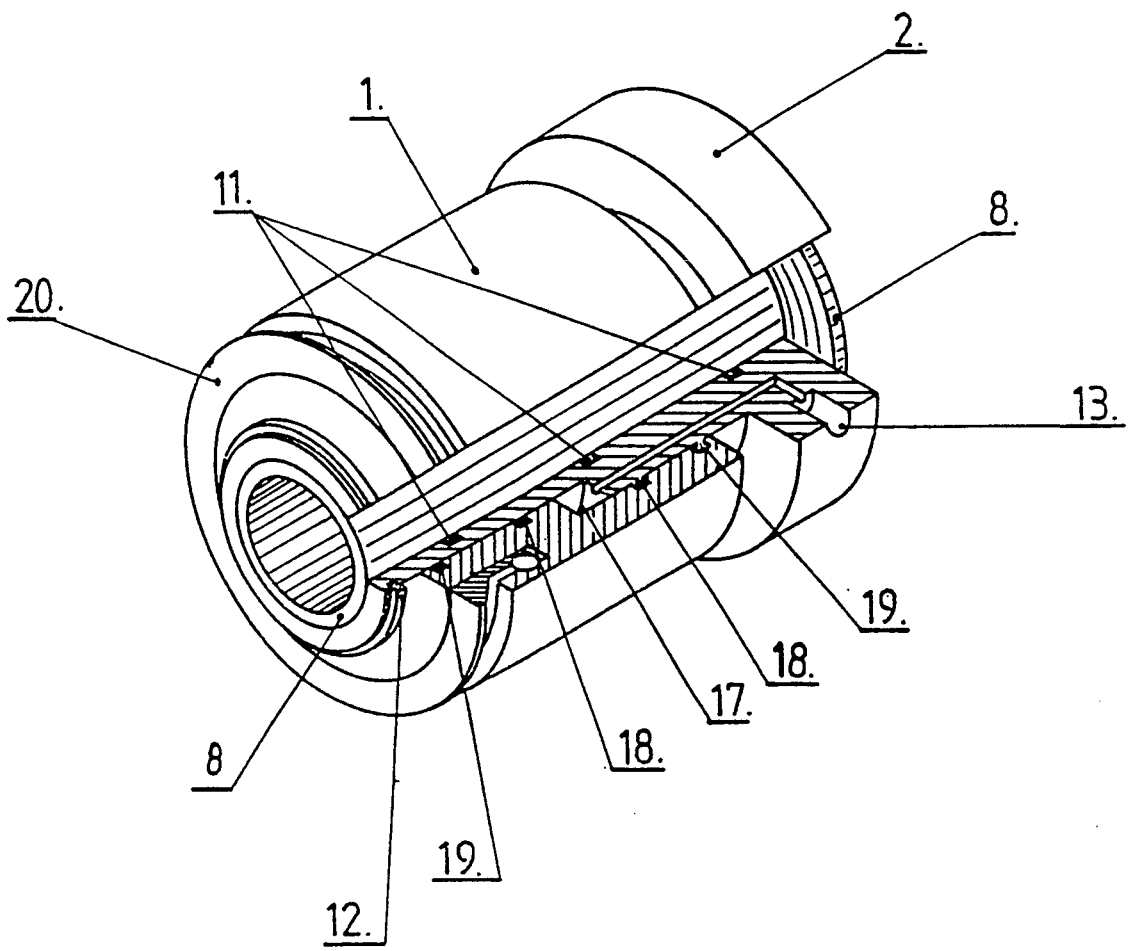
FIG. 3 is a perspective view of the device shown in FIG. 1, mounted on the tube of the clutch bearing, part of the interior of the device being shown cut away.

As shown in FIGS. 1, 2 and 3, the device comprises a cylinder 2, on which a piston 1 can slide. Both the cylinder 2 and the piston 1 are open at the two ends.

The cylinder 2 has two different outside diameters corresponding to the two inside diameters of the piston 1.

A chamber 17 is formed between the two different diameters of the piston and of the cylinder 2.

Figure 4:
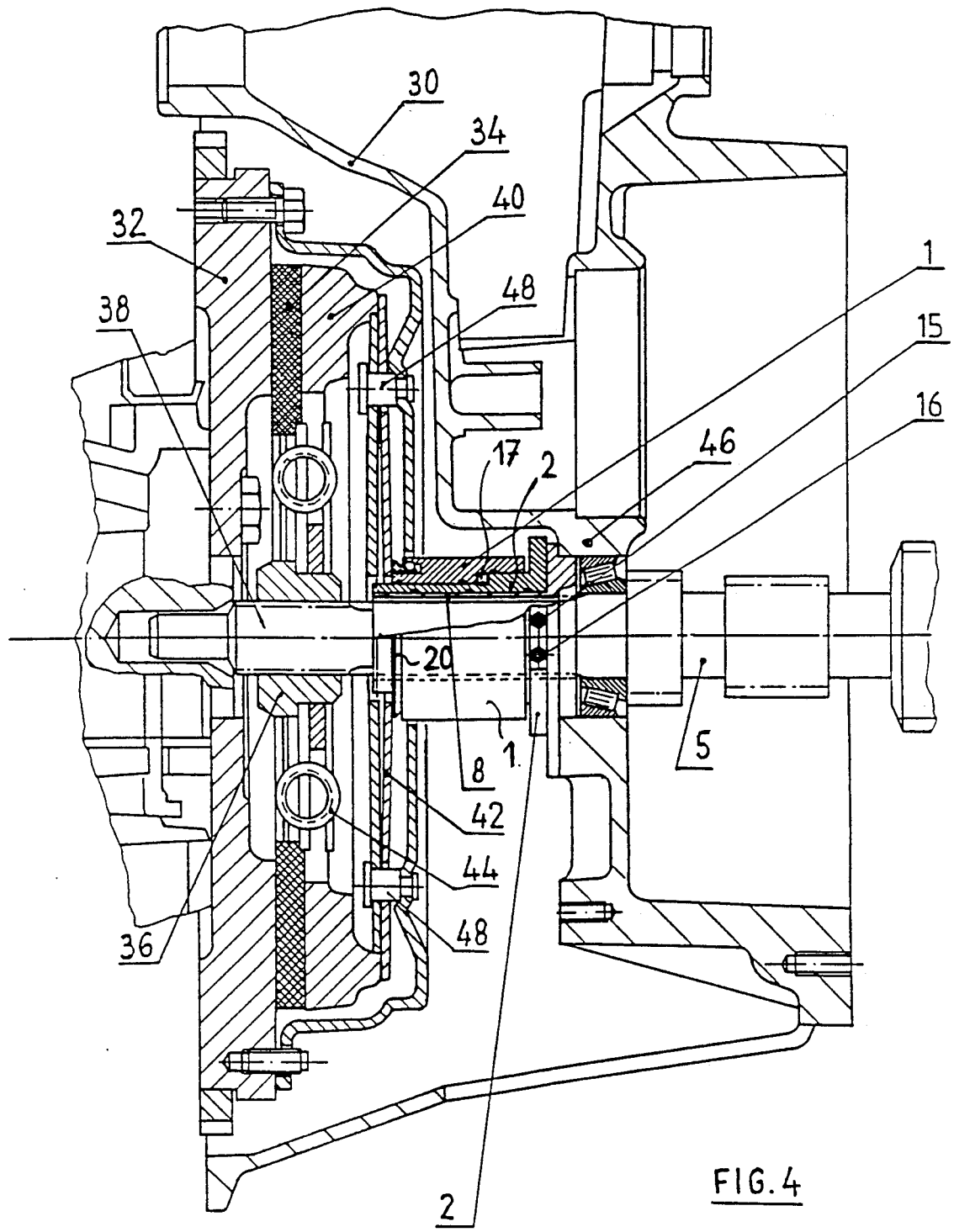
FIG. 4 is a general sectional view of a clutch equipped with the control device which is the subject of the invention.

The cylinder 2 has a central bore 6, through which passes the driven shaft or primary shaft of the gearbox 5 (see FIG. 4).

The cylinder 2 has a lateral orifice 3 which is intended for receiving the connector of a fluid feed pipe 15 connected to the master cylinder (not shown) actuated by the clutch pedal. The cylinder 2 also has a second lateral bleed orifice 13 connected to a bleed pipe 16.

The chamber 17 is in communication with the orifice 3 for the feed of fluid under pressure and with the orifice 13 for bleeding said fluid.

In the closed position, this chamber 17 is of restricted volume. The pressure of the fluid introduced into the chamber via the orifice 3 pushes the piston 1, thereby increasing the volume of this chamber.

The cylinder 2 bears at its end in the form of a collar on the clutch housing or a stationary part fixed to the clutch housing. On the opposite side, a ring 20, constituting the clutch bearing, is situated in a cavity 45 in the end of piston 1, the ring 20, the upper wall of cavity 45 and the balls 43 constituting a ball-bearing fitting by means of which piston 1 bears of the piston 1 bears, by means of a ring 20 mounted on a ball-bearing, on the levers which make it possible to move the disc away from the clutch plate or on the diaphragm spring used in many modern clutches.

The injection of the fluid under the action of the master cylinder causes the piston 1 to move away from the cylinder 2 and consequently the plate to move away from the clutch disc.

The device which is the subject of the invention is easy to produce and convenient to install. In fact, the piston 1 and the cylinder 2 are both cylinders of revolution. The same applies to the passage 6 which is made for the rotary shaft and which is likewise in the form of a cylinder of revolution and is concentric relative to the piston and cylinder.

In a preferred embodiment, the feed pipe 15 and the bleed pipe 16 meet one another in a rigid element 14 which has two channels. One of the channels receives the fluid feed pipe 15 and the other the bleed pipe 16. The rigid element 14 is shaped so as to fit easily into an orifice already present in the clutch housing and preferably in the orifice provided for the passage of the clutch fork. One advantage of this arrangement is that the rigid element 14 acts as a detent lever preventing any rotational movement of the assembly 1, 2.

To ensure sealing between the piston 1 and the cylinder 2, two O-rings 18 are provided. They ensure sufficient sealing, whilst at the same time costing much less than the flexible diaphragms provided in several documents mentioned above. They preferably have a round cross-section.

The device can easily replace the assembly formed by the bearing and the fork in most of the clutches which are on the market. It is possible for the device which is the subject of the invention to be used both during the manufacture of the clutches at the factory and to install it at a later date on vehicles already on the market.

So that the device as a whole can be transported easily and to prevent the piston 1 from sliding out of the cylinder 2, an outer annular groove is made at that end of the cylinder 2 at which the piston 1 has been introduced.

A hoop 12 is fastened in this groove and projects from the groove, its outside diameter being larger than the inside diameter of the cylinder 2, and this hoop prevents the piston 1 from coming out of the cylinder 2.

Elastic gaskets, such as 0-rings 11, are provided in grooves within the bore 6 and allow easy mounting on the tube 8 generally provided for mounting a conventional fork bearing.

The control device, once installed, is positioned and held against the wall of the housing as a result of the thrust of the diaphragm spring against the ring 20.

Another advantage of the gaskets 11 is that they make it possible to damp the vibrations in the assembly as a whole.

There is no need to provide other means for fastening the device: it is sufficient to slide it as such onto the tube which surrounds the driveshaft and which is already present.

As shown in FIGS. 1 and 3, the free end of the piston 1 is advantageously equipped with a ball-bearing fitting provided with a thrust ring 20 capable of functioning as a clutch bearing. The clutch bearing thus becomes an integral part of the control device according to the invention.

The control device acting as a piston thus performs a double function because it likewise acts as a bearing, thereby affording the advantage of avoiding the provision of a clutch bearing.

To increase the efficiency and safety of use of the device which is the subject of the invention, a supplement of two O-rings 19 arranged towards the ends of the piston 1 can also be added, in order to protect the assembly as a whole against any infiltration of dust.

As shown in FIG. 4, the clutch housing 30 contains a flywheel 32 driven by the crankshaft of the engine, a disc 34 equipped with a friction lining and mounted on a splined hub 36 axially moveable on a splined part 38 of the primary shaft 5 of the gearbox, a moveable pressure plate 40 mounted on a diaphragm spring 42 and an end bearing 46 through which the shaft 5 passes.

The control device which is the subject of the present invention is arranged between the end bearing 46 of the housing 30 and the diaphragm spring 42 and is mounted on the tube 8 surrounding the shaft 5.

In the normal position, the pressure plate 40 presses the friction disc 34 against the flywheel 32 under the action of the diaphragm spring 42.

The rotation of the flywheel 32 driven by the engine is thus transmitted to the shaft 5 by means of the friction disc 34, shock-absorber springs 44 and the splined hub 36.

If the clutch pedal is pressed, the master cylinder conveys fluid under pressure via the pipe 15 into the chamber 17, and the piston moves away from the cylinder 2. With the cylinder 2 bearing against the end bearing 46 of the clutch housing 30, the piston 1, by means of the ring 20 mounted at the free end of the piston 1, bears against the central part of the diaphragm spring 42 which tilts about the bearing points 48, thereby causing the retraction of the pressure plate 40 and freeing the friction disc 34, thus eliminating any transmission of rotational movement from the engine flywheel 32 to the primary shaft 5 of the gearbox.

When the clutch pedal ceases to be pressed, the pressure is cancelled in the chamber 17, the fluid is discharged via the bleed pipe 16 and the piston 1 returns to its initial position, assisted by the thrust of the diaphragm spring 42 on the ring 20 of the piston 1.

The device according to the invention has considerable advantages in relation to the existing control because it allows:

a easy and economical construction of the assembly as a whole;

interchangeable mounting without a modification of the existing components by eliminating the conventional elements, such as: fork, clutch bearing, fork pivot axle, control rod and hydraulic receiver cylinder;

rapid and efficient mounting by simple sliding on the existing bearing tube without any other fastening means;

the elimination of the conventional clutch bearing by incorporating a ball-bearing fitting with a pressure ring in the free end of the piston;

the connection of hydraulic pipe lines for the control device via existing orifices in the clutch housing;

a compact and independent assembly which can be fitted on any existing clutch.

Of course, embodiments other than those described remain possible, without departing from the scope of the present invention.

I claim:

1. In a friction clutch comprising two rotary parts (32,34) capable of being pressed against one another or separated as desired; a tube (8), intended for carrying at one end a conventional clutch bearing, concentrically surrounding a rotary shaft (5) and bearing at its other end against an end bearing (46) of a clutch housing (30), the improved clutch control device comprising: a piston (1), having two different inside diameters, adapted to slide on a cylinder (2) having a central bore (6) and two different outside diameters corresponding to the two inside diameters of piston (1), whereby a chamber (17) of varying volume can be defined between them by sliding piston (1) along cylinder (2); an orifice (3) for forcing fluid under pressure into chamber (17) and an orifice (13) for bleeding fluid therefrom; the assembly comprising cylinder (2) and piston (1) being capable of being slid onto tube (8) so that at one end the cylinder (2) bears against the end bearing (46) of clutch housing (30), while at the other end piston (1) indirectly bears on a moveable part (42) in contact with rotary part (34) through the means of a ring (20) located in a cavity (45) situated at the end of piston (1), said ring (20) constituting the clutch bearing and, together with the outer wall of the cavity (45) and balls (43), forming a ball-bearing fitting; the introduction of fluid under pressure into chamber (17) causing piston (1) to slide on cylinder (2) in the direction of ring (20) thereby setting in motion ring (20) and, in turn, moveable part (42) which causes the separation of rotary parts (32,34), the reverse action being initiated when the fluid is bled from chamber (17).

2. Control device according to claim 1 in which the cylinder (2) has, on its inner surface, circular grooves in which are arranged circular elastic gaskets, (11) allowing the device to be mounted and held on the tube (8), with vibrations being eliminated.

3. Control device according to claim 2, in which the sealing between the piston (1) and the cylinder (2) is obtained by means of at least two circular elastic gaskets, (18).

4. Control device according to claim 3 in which the elastic gaskets, (19) are provided as protection against dust and are arranged between the piston (1) and the cylinder (2) and towards the outer sides of piston (1).

5. Control device according to claim 4 in which the circular elastic gaskets, (11, 18, 19) have a round cross-section.

6. Control device according to claim 1, in which the cylinder (2), at its free end, has an outer annular groove in which a hoop (12) projecting from the groove is fastened, its outside diameter being larger than the inside diameter of the piston (1), the hoop (12) thus being capable of preventing the piston (1) from coming off of the cylinder (2).

7. A control device according to claim 1 in which orifice (3) communicates with a fluid feed pipe (15) and orifice (13) communicates with fluid bleed pipe (16).

8. Control device according to claim 7 in which the feed pipe (15) and the bleed pipe (16) are connected to a rigid element (14) through which pass at least two channels, the rigid element (14) being shaped so as to fit into an existing orifice of the clutch housing, thereby preventing any rotational movement of the assembly comprising piston (1) and cylinder (2) on the tube.

* * * * *